(12) United States Patent
Herz

(10) Patent No.: US 8,009,962 B1
(45) Date of Patent: Aug. 30, 2011

(54) APPARATUS AND METHOD FOR PROCESSING AN AUDIO/VIDEO PROGRAM

(75) Inventor: William Samuel Herz, Hayward, CA (US)

(73) Assignee: Nvidia Corporation, Santa Clara, CA (US)

( * ) Notice: Subject to any disclaimer, the term of this patent is extended or adjusted under 35 U.S.C. 154(b) by 1088 days.

(21) Appl. No.: 10/727,710

(22) Filed: Dec. 3, 2003

(51) Int. Cl.
- H04N 9/80 (2006.01)
- H04N 5/932 (2006.01)
- H04N 5/935 (2006.01)
- H04N 5/92 (2006.01)

(52) U.S. Cl. ......... 386/248; 386/239; 386/201; 386/326

(58) Field of Classification Search .................. 386/113, 386/120, 27, 33, 39, 45, 46, 95–96, 104–106, 386/109, 111–112, 124–126, 239, 201, 248, 386/326

See application file for complete search history.

(56) References Cited

U.S. PATENT DOCUMENTS

| | | | | |
|---|---|---|---|---|
| 5,125,043 A * | 6/1992 | Karlsson | ........................ | 382/300 |
| 5,687,160 A | 11/1997 | Aotake et al. | | |
| 5,754,243 A * | 5/1998 | Kurihara et al. | .............. | 348/445 |
| 6,009,233 A * | 12/1999 | Tsujimura et al. | .............. | 386/95 |
| 6,064,385 A * | 5/2000 | Sturgeon et al. | .............. | 715/841 |
| 6,310,655 B1 | 10/2001 | Godwin | | |
| 6,393,202 B1 | 5/2002 | Yamauchi et al. | | |
| 6,400,852 B1 | 6/2002 | Miller, II et al. | | |
| 6,493,506 B1 * | 12/2002 | Schoner et al. | ................ | 386/126 |
| 6,694,087 B1 * | 2/2004 | Weaver | ........................... | 386/52 |
| 7,158,158 B1 * | 1/2007 | Fleming et al. | ............... | 345/698 |
| 2004/0128701 A1 * | 7/2004 | Kaneko et al. | ................ | 725/136 |
| 2004/0261099 A1 * | 12/2004 | Durden et al. | ................... | 725/32 |

OTHER PUBLICATIONS

Edmonton Public Library, The Source Article "This film has been Modified" from http://www.epl.ca/TheSource/V5-3/EPL Videos.cfm (Oct. 6, 2003) 2 pages.
Pan and Scan—"CyberLink PowerDVD Tips and Tricks" from http://www.gocyberlink.com/english/products/pwoerdivd/tips)tricks/Pan_Scan /panscan.jsp (Sep. 3, 2003) p. 1 of 1.
Pan and Scan—"CyberLink PowerDVD Tips and Tricks" from http://www.gocyberlink.com/english/products/pwoerdivd/tips)tricks/Pan_Scan /panscan.jsp (Sep. 3, 2003) 2 pages.

* cited by examiner

*Primary Examiner* — Thai Tran
*Assistant Examiner* — Daquan Zhao
(74) *Attorney, Agent, or Firm* — Cooley LLP (57) ABSTRACT

Apparatus and method for processing an audio/video program is described. In one embodiment, the apparatus includes a preferences module configured to coordinate the specification of a presentation setting with a portion of the audio/video program. The apparatus also includes a presentation module coupled to the preferences module. The presentation module is configured to selectively apply the presentation setting to the portion of the audio/video program during subsequent playback of the audio/video program.

10 Claims, 5 Drawing Sheets

APPARATUS AND METHOD FOR PROCESSING AN AUDIO/VIDEO PROGRAM

BRIEF DESCRIPTION OF THE INVENTION

The invention relates generally to audio/video programs. More particularly, the invention relates to an apparatus and method for processing an audio/video program.

BACKGROUND OF THE INVENTION

A Digital Versatile Disk ("DVD") is an optical storage medium that can be used to store both audio content and video content. Advances in DVD technology have resulted in a number of useful features for consumers and video production professionals. Some of the more useful features are those that allow playback of stored content to be customized based on a user's preferences. In particular, an existing DVD player typically allows a user to specify a number of listening and viewing options. For example, prior to viewing a movie, the user can select one of a number of different sound tracks that accompany the movie. As another example, the user can choose to view the movie in a letterbox format or a pan and scan format.

Although existing DVD technology provides for some customization of playback, the level of customization that is provided can be deficient in certain respects. For example, while an existing DVD player can allow a user to specify listening and viewing options for a current playback session, the specified listening and viewing options are typically not retrievable after the current playback session. Thus, in order to replicate a customized viewing experience, the user may need to re-specify the same listening and viewing options at each subsequent playback session. In some instances, the user may wish to customize playback by specifying different listening and viewing options as scenes change or as characters move. As can be appreciated, requiring the user to re-specify these listening and viewing options at each subsequent playback session is not only tedious and time-consuming but also interrupts the viewing experience.

As another example, while an existing DVD player can allow a user to specify listening and viewing options while using that DVD player, the specified listening and viewing options typically cannot be exported to another existing DVD player. Thus, in order to replicate a customized viewing experience while using another existing DVD player, the same listening and viewing options may need to be specified, thus impeding sharing of the customized viewing experience among different users.

It is against this background that a need arose to develop the apparatus and method described herein.

SUMMARY OF THE INVENTION

In one innovative aspect, the invention relates to an apparatus to process an audio/video program. In one embodiment, the apparatus includes a preferences module configured to coordinate the specification of a presentation setting with a portion of the audio/video program. The apparatus also includes a presentation module coupled to the preferences module. The presentation module is configured to selectively apply the presentation setting to the portion of the audio/video program during subsequent playback of the audio/video program.

In another innovative aspect, the invention relates to a computer-readable medium. In one embodiment, the computer-readable medium includes instructions to coordinate the specification of a first display setting with a first video frame of a set of video frames. The computer-readable medium also includes instructions to coordinate the specification of a second display setting with a second video frame of the set of video frames. The computer-readable medium further includes instructions to apply, during subsequent playback of the set of video frames, the first and second display settings to the first and second video frames, respectively.

In a further innovative aspect, the invention relates to a method of processing an audio/video program. In one embodiment, the method includes coordinating storage of a set of user-specified presentation settings. Each user-specified presentation setting of the set of user-specified presentation settings is associated with a respective portion of the audio/video program. The method also includes coordinating playback of the audio/video program based on the set of user-specified presentation settings.

BRIEF DESCRIPTION OF THE DRAWINGS

For a better understanding of the nature and objects of some embodiments of the invention, reference should be made to the following detailed description taken in conjunction with the accompanying drawings, in which.

DETAILED DESCRIPTION OF THE INVENTION

Figure 1:
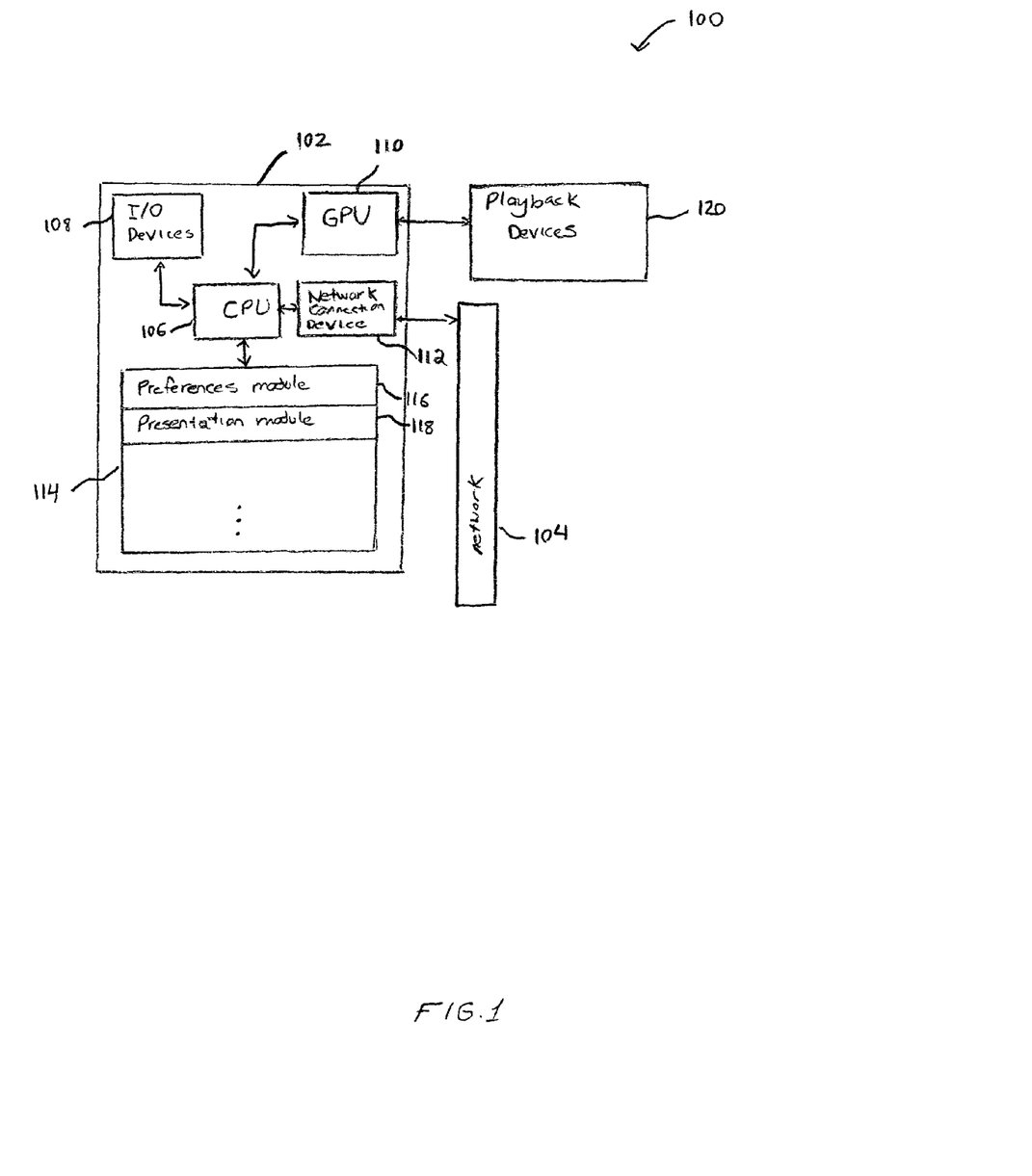
FIG. 1 illustrates a system that can be operated in accordance with an embodiment of the invention.

FIG. 1 illustrates a system 100 that can be operated in accordance with an embodiment of the invention. The system 100 includes a computer 102, which can be, for example, a personal computer, a workstation, a set-top box, or a television set with digital signal processing capability. As illustrated in FIG. 1, the computer 102 is connected to a set of playback devices 120 using any wire or wireless transmission channel. The set of playback devices 120 can include, for example, an audio system, a DVD player, and a display device such as a television set. The computer 102 is also connected to a network 104 using any wire or wireless transmission channel.

The computer 102 includes a Central Processing Unit ("CPU") 106 that is connected to a set of Input/Output Devices ("I/O Devices") 108. The set of I/O Devices 108 can include, for example, a keyboard, a mouse, a printer, a remote control device, and a video monitor. In the illustrated embodiment, the CPU 106 is also connected to a Graphics Processing Unit ("GPU") 110, such as, for example, one available from NVIDIA® Corporation, located in Santa Clara, Calif. The CPU 106 is also connected to a network connection device 112, which is used to establish conventional network communications with the network 104.

In the illustrated embodiment, the CPU 106 and the GPU 110 are configured to perform a number of processing operations in connection with playback of an audio/video program using the set of playback devices 120. The audio/video program can represent a presentation, such as, for example, a movie, a slide show, a sports event, a videoconference, or a television show. Typically, the audio/video program includes video content associated with the presentation, and the video content can include multiple video frames that represent a sequence of images of the presentation. In some instances, the audio/video program can also include audio content associated with the presentation. The audio/video program can be stored in, for example, a DVD, and can be read by the set of playback devices 120. Alternatively, or in conjunction, the audio/video program can be stored in a memory 114 that is connected to the CPU 106. It is also contemplated that the audio/video program can be received via the network 104.

As illustrated in FIG. 1, the memory 114 stores a set of computer programs that direct the CPU 106 and the GPU 110 to perform processing operations in connection with playback of the audio/video program. In particular, the memory 114 stores a preferences module 116 and a presentation module 118. As further described below, the preferences module 116 and the presentation module 118 can be used to process the audio/video program to allow its playback to be customized in accordance with user-specified presentation settings.

Referring to FIG. 1, the preferences module 116 is configured to coordinate user specifications of presentation settings with various portions of the audio/video program. In particular, while viewing a particular portion of the audio/video program during an initial playback session, a user may wish to specify a presentation setting for a portion of the audio/video program. The presentation setting can correspond to, for example, an audio setting or a display setting. Examples of audio settings that can be specified include, but are not limited to, an audio channel setting, an audio field setting, an audio format setting, a dynamic range setting, a language setting, a pitch setting, a playback speed setting, a tone setting, and a volume setting. Examples of display settings that can be specified include, but are not limited to, a brightness setting, a black and white setting, a contrast setting, a color setting, a fast motion setting, a flicker setting, a gamma setting, a hue setting, a letterbox setting, a non-square zoom setting, a pan and scan setting, a pillar-box setting, a pixel blurring setting, a pixel sharpening setting, a red-eye setting, a slow motion setting, and a zoom setting. The user can specify a presentation setting using the set of I/O devices 108, such as, for example, via a mouse click, a keyboard selection, or a remote control device selection. In a similar manner, the user can specify additional presentation settings for the same portion of the audio/video program or for other portions of the audio/video program. It is contemplated that the preferences module 116 can provide a user-interface to facilitate user specifications of the presentation settings.

In the illustrated embodiment, when the user specifies a presentation setting while viewing a particular portion of the audio/video program, the preferences module 116 is configured to coordinate the presentation setting with that portion of the audio/video program. In particular, the preferences module 116 is configured to coordinate storage of the presentation setting for that portion of the audio/video program in the memory 114. In a similar manner, the preferences module 116 is configured to coordinate storage of additional user-specified presentation settings for the same portion of the audio/video program or for other portions of the audio/video program.

It is contemplated that the preferences module 116 can include exporting and importing capabilities to facilitate sharing of a customized viewing experience. In particular, the preferences module 116 can be configured to transmit user-specified presentation settings to another user via the network 104. Also, the preferences module 116 can be configured to receive user-specified presentation settings from another user via the network 104, which user-specified presentation settings can be stored in the memory 114.

Referring to FIG. 1, the presentation module 118 is configured to selectively apply the user-specified presentation settings to the various portions of the audio/video program. In particular, in response to the user specifying a presentation setting for a portion of the audio/video program, the presentation module 118 is configured to apply the presentation setting to that portion of the audio/video program. The presentation module 118 can apply the presentation setting during the initial playback session, such as, for example, substantially on-the-fly. Advantageously, since the presentation setting for that portion of the audio/video program is stored in the memory 114, the presentation module 118 can also apply the presentation setting during a subsequent playback session. In particular, in connection with the subsequent playback session, the presentation module 118 can retrieve the presentation setting from the memory 114 and apply the presentation setting to that portion of the audio/video program without requiring the user to re-specify the presentation setting. In a similar manner, the presentation module 118 can retrieve additional user-specified presentation settings from the memory 114 and apply the additional user-specified presentation settings to the same portion of the audio/video program or to other portions of the audio/video program. Thus, once the user has customized playback of the audio/video program during the initial playback session, a customized viewing experience can be readily replicated without requiring the user to re-specify presentation settings during the subsequent playback session.

As discussed previously, the preferences module 116 can be configured to receive user-specified presentation settings from another user via the network 104, which user-specified presentation settings can be stored in the memory 114. The presentation module 118 can retrieve the user-specified presentation settings from the memory 114 and selectively apply the user-specified presentation settings to various portions of the audio/video program. Thus, a customized viewing experience can be readily shared among different users without requiring the same presentation settings to be re-specified.

The foregoing discussion provides a general overview of an embodiment of the invention. Attention now turns to FIG. 2, which illustrates a flow chart for processing an audio/video program in accordance with another embodiment of the invention.

Figure 2:
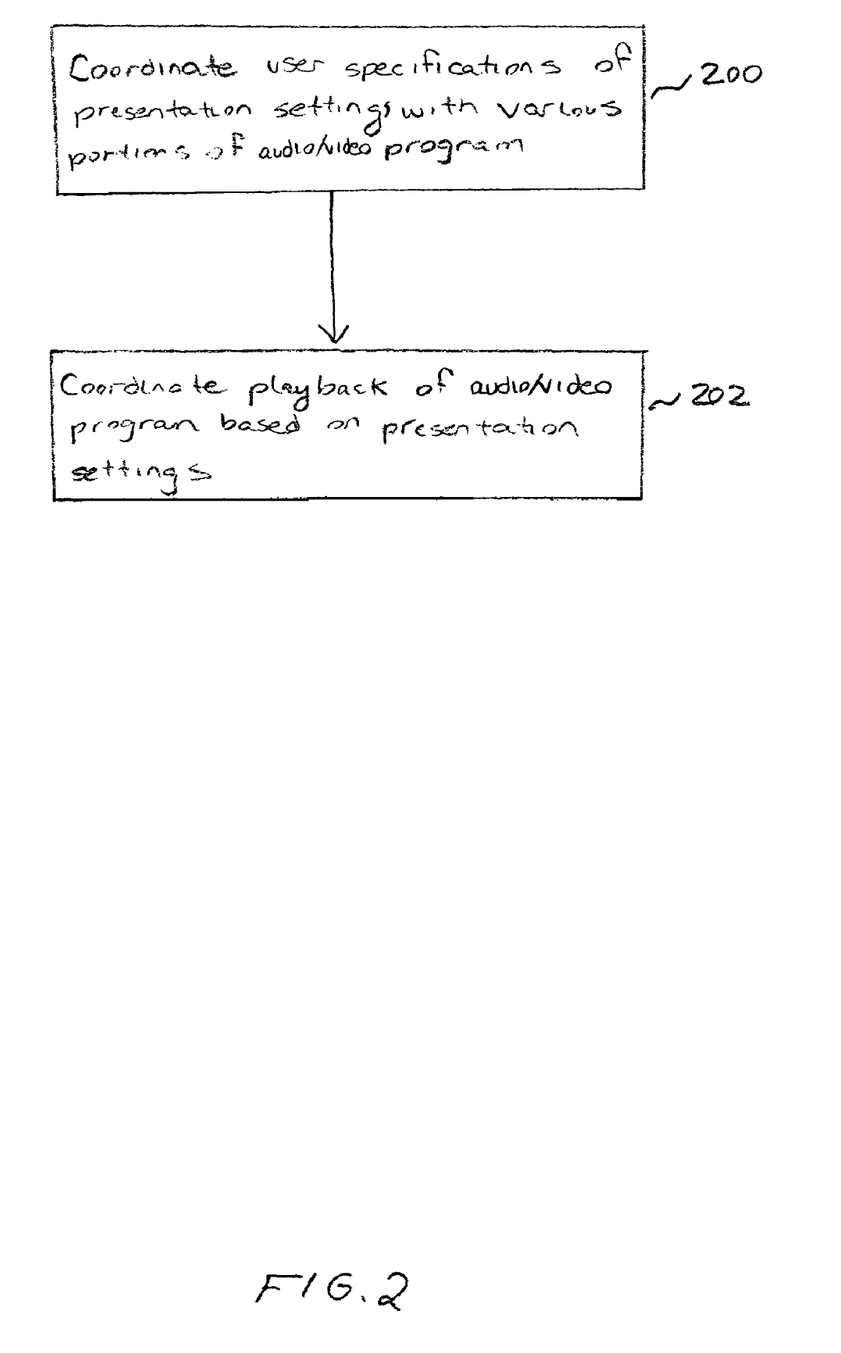
FIG. 2 illustrates a flow chart for processing an audio/video program in accordance with an embodiment of the invention.

The first operation illustrated in FIG. 2 is to coordinate user specifications of presentation settings with various portions of the audio/video program (block 200). While viewing the audio/video program during an initial playback session, a user can specify the presentation settings for the various portions of the audio/video program. For example, the user can specify an audio setting for one portion of the audio/video program and a different audio setting for another portion of the audio/video program. As another example, the user can specify a display setting for one portion of the audio/video program and a different display setting for another portion of the audio/video program.

Figure 3:
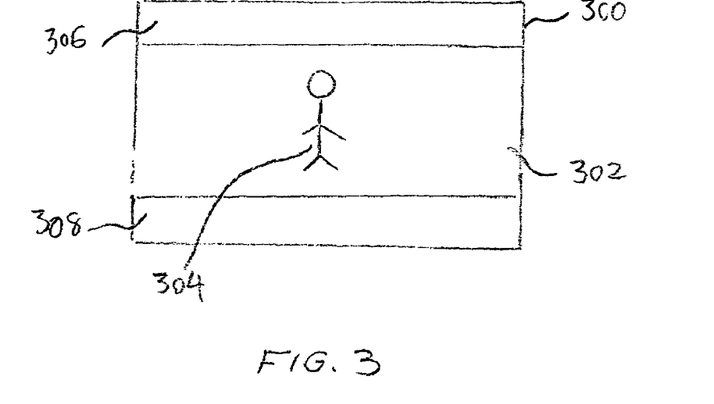
FIG. 3, FIG. 4, and FIG. 5 illustrate various examples of display settings that can be specified for an audio/video program.
Figure 4:
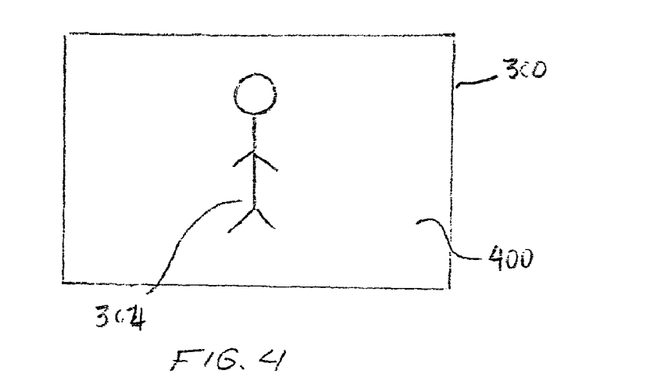
Figure 5:
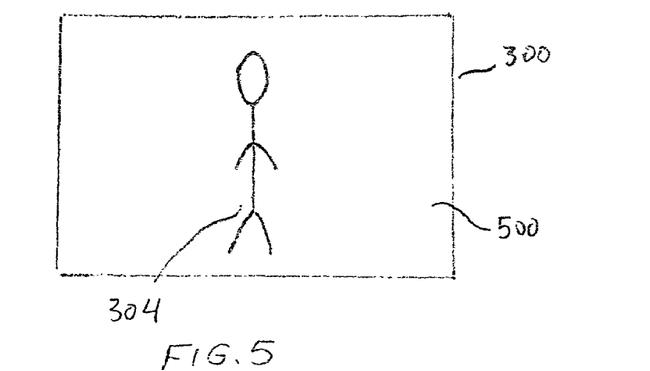

FIG. 3, FIG. 4, and FIG. 5 illustrate various examples of display settings that can be specified for an audio/video program. In the illustrated examples, the audio/video program includes a video frame having an original aspect ratio (i.e., a width to height ratio) of 16×9, and the video frame is shown displayed on a screen 300 having an aspect ratio of 4×3. FIG. 3 illustrates an image 302 of the video frame that includes a representation of an object 304. As illustrated in FIG. 3, the video frame is displayed in accordance with a letterbox setting. In particular, the image 302 substantially retains the original aspect ratio of the video frame, and horizontal black stripes 306 and 308 are displayed at the top and bottom of the image 302. FIG. 4 and FIG. 5 illustrate the same video frame displayed in accordance with a pan and scan setting and a non-square zoom setting. As illustrated in FIG. 4, the video frame is proportionally scaled along the horizontal and vertical directions, such that a resulting scaled image of the video frame fills the screen 300 while substantially retaining the original aspect ratio of the video frame. A portion 400 of the resulting scaled image is shown displayed on the screen 300. As illustrated in FIG. 5, the video frame is disproportionally scaled along the vertical direction, such that a resulting scaled image 500 fills the screen 300 and has an aspect ratio of 4×3. While FIG. 3, FIG. 4, and FIG. 5 illustrate different display settings for the same video frame included in the audio/video program, it is contemplated that the different display settings can be specified for different video frames included in the audio/video program. Also, it is contemplated that similar display settings can be specified for a video frame having an original aspect ratio other than 16×9, such as, for example, 1.85×1.

Figure 6:
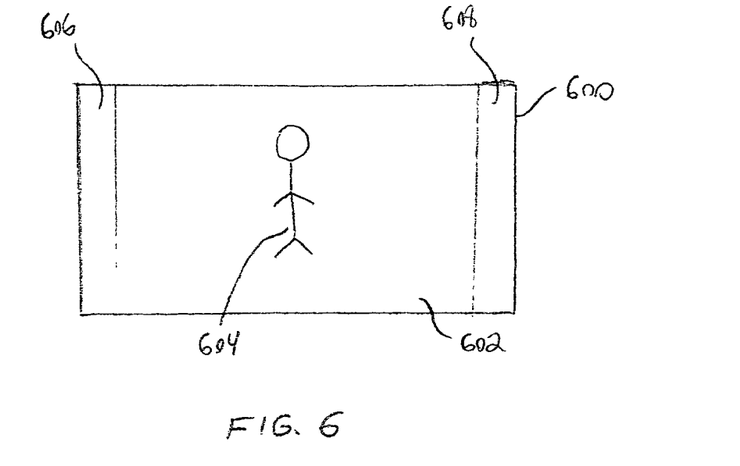
FIG. 6, FIG. 7, and FIG. 8 illustrate additional examples of display settings that can be specified for an audio/video program.
Figure 7:
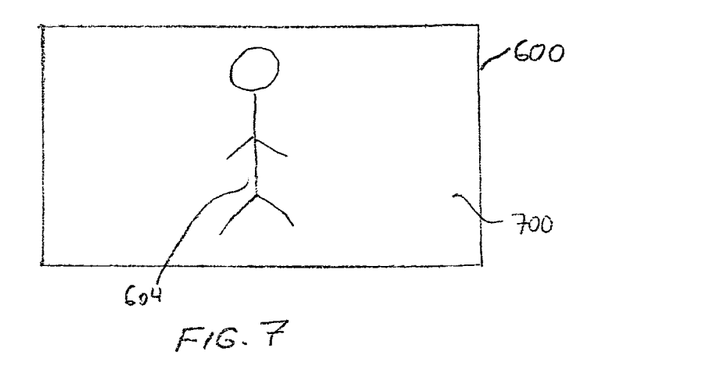
Figure 8:
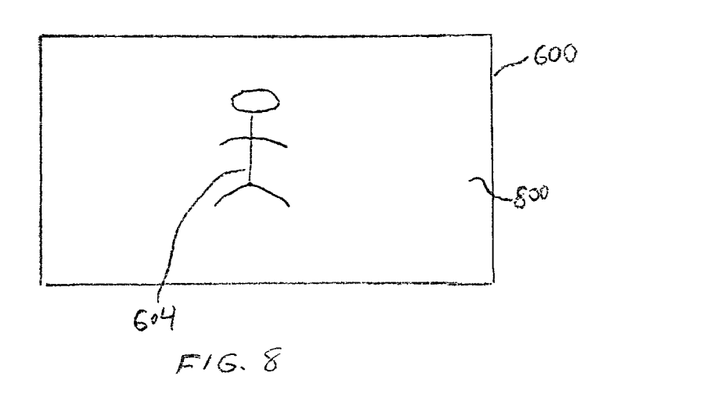

FIG. 6, FIG. 7, and FIG. 8 illustrate additional examples of display settings that can be specified for an audio/video program. In the illustrated examples, the audio/video program includes a video frame having an aspect ratio of 4×3, and the video frame is shown displayed on a screen 600 having an aspect ratio of 16×9. FIG. 6 illustrates an image 602 of the video frame that includes a representation of an object 604. As illustrated in FIG. 6, the video frame is displayed in accordance with a pillar-box setting. In particular, the image 602 substantially retains the original aspect ratio of the video frame, and vertical black stripes 606 and 608 are displayed at the sides of the image 602. FIG. 7 and FIG. 8 illustrate the same video frame displayed in accordance with a pan and scan setting and a non-square zoom setting. As illustrated in FIG. 7, the video frame is proportionally scaled along the horizontal and vertical directions, such that a resulting scaled image of the video frame fills the screen 600 while substantially retaining the original aspect ratio of the video frame. A portion 700 of the resulting scaled image is shown displayed on the screen 600. As illustrated in FIG. 8, the video frame is disproportionally scaled along the horizontal direction, such that a resulting scaled image 800 fills the screen 600 and has an aspect ratio of 16×9. While FIG. 6, FIG. 7, and FIG. 8 illustrate different display settings for the same video frame included in the audio/video program, it is contemplated that the different display settings can be specified for different video frames included in the audio/video program.

Figure 9:
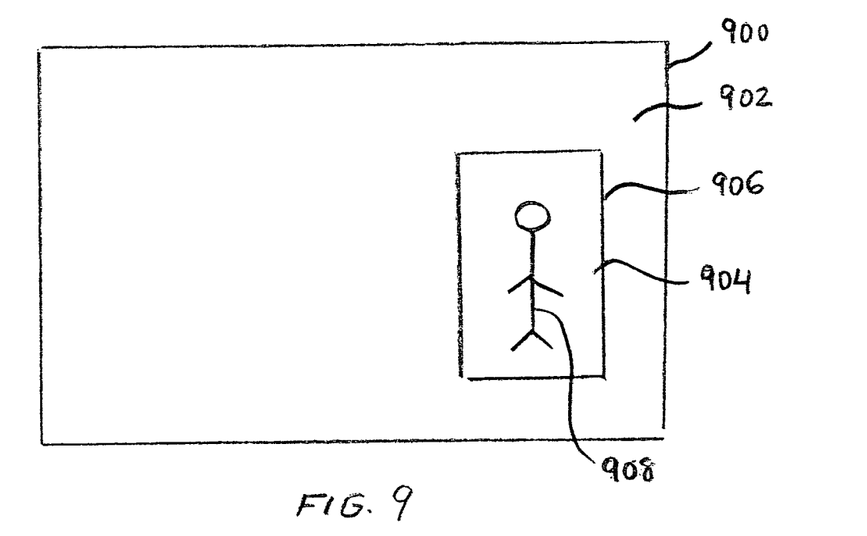
FIG. 9 and FIG. 10 illustrate further examples of display settings that can be specified for an audio/video program.
Figure 10:
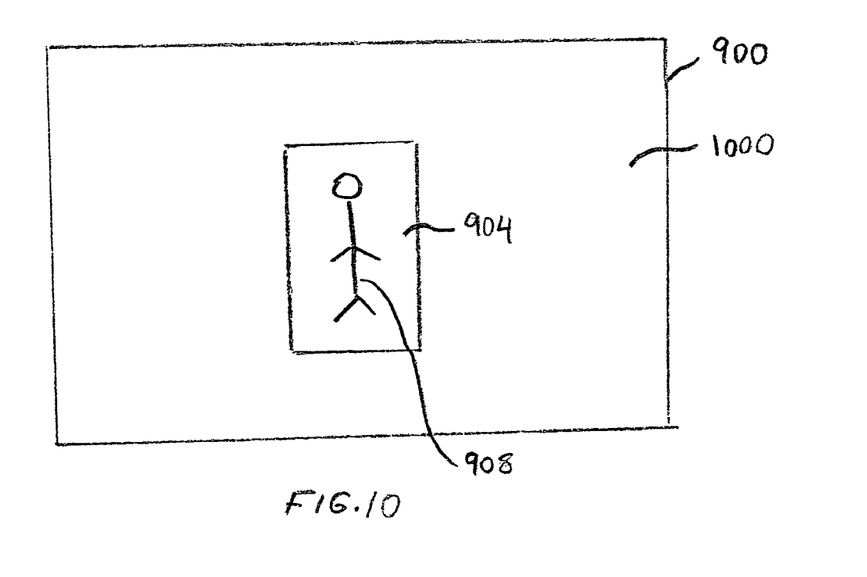

FIG. 9 and FIG. 10 illustrate further examples of display settings that can be specified for an audio/video program. In the illustrated examples, the audio/video program includes a sequence of video frames that are shown displayed on a screen 900. FIG. 9 illustrates an image 902 of a first video frame in which a target region 904 is defined. As illustrated in FIG. 9, the target region 904 corresponds to a portion of the video frame defined by a rectangular boundary 906, and an object 908 is represented within the rectangular boundary 906. In the illustrated example, a user may be particularly interested in the object 908 and may wish to view an enlarged representation of the object 908. For example, the object 908 can correspond to an actor in a movie or a participant of a sports event. The user can specify the target region 904 via, for example, a mouse click, a keyboard selection, or a remote control device selection. In addition, the user can specify various display settings for the target region 904. For example, the user can specify scaling factors for the target region 904 along the horizontal and vertical directions, such that a resulting scaled image of the target region 904 can fill the screen 900. Alternatively, or in conjunction, the user can specify an aspect ratio for the target region 904, such that a resulting scaled image of target region 904 has the specified aspect ratio.

FIG. 10 illustrates an image 1000 of a second video frame in which the target region 904 has been shifted relative to its previous position shown in FIG. 9. In the illustrated example, the object 908 moves from left to right, and the user can specify a shifting of the target region 904 to keep the target region 904 substantially centered with respect to the object 908. The user can specify the shifting of the target region 904 via, for example, a mouse click, a keyboard selection, or a remote control device selection. In addition, the user can specify scaling factors or an aspect ratio for the target region 904, such that a resulting scaled image of the target region 904 can fill the screen 900.

Returning to block 200 of FIG. 2, a preferences module (e.g., the preferences module 116) is configured to coordinate the user specifications of the presentation settings with the various portions of the audio/video program based on time stamps associated with those portions of the audio/video program. As discussed previously, the audio/video program can include multiple video frames, and a portion of the audio/video program can correspond to a subset of the multiple video frames. As one of ordinary skill in the art will understand, each video frame of the multiple video frames can be associated with a particular time stamp, and this time stamp is typically indicative of the order in which that video frame is displayed with respect to other video frames. When the user specifies a presentation setting while a particular video frame is displayed, the preferences module can coordinate the presentation setting with that video frame based on its time stamp. In a similar manner, the preferences module can coordinate additional user-specified presentation settings with the same video frame or with other video frames. It is also contemplated that the preferences module can coordinate a user-specified presentation setting with a particular video frame based on another type of indicia or metadata associated with that video frame.

Based on coordinating the user-specified presentation settings with the various portions of the audio/video program, the preferences module is configured to coordinate storage of the user-specified presentation settings for those portions of the audio/video program. Thus, user inputs in connection with specifying the presentation settings can be stored and synchronized with those portions of the audio/video program. In the illustrated embodiment, the preferences module is configured to coordinate storage of indicia or metadata associated with the user-specified presentation settings in a memory (e.g., the memory 114). Such indicia can be represented as a table including a number of entries, and each entry can include a set of user-specified presentation settings for a particular portion of the audio/video program. For example, an entry can include a time stamp associated with a particular portion of the audio/video program and a set of user-specified presentation settings for that portion of the audio/video program. An entry can also include an attribute of the audio/video program, such as, for example, a title of the audio/video program or a digital signature of the audio/video program, such that the entry can be correlated with the audio/video program and retrieved in connection with subsequent playback of the audio/video program. Such configuration is useful, for example, to allow the user to customize playback of different audio/video programs in accordance with respective user-specified presentation settings. It is also contemplated that an entry can include an attribute of the user, such as, for example, a name of the user, such that the entry can be correlated with the user and retrieved in connection with subsequent playback of the audio/video program by the user. Such configuration is useful, for example, to allow different users to customize playback of the audio/video program in accordance with respective user-specified presentation settings.

As discussed previously, the preferences module can be configured to receive user-specified presentation settings from another user via a network (e.g., the network 104), and the preferences module can be configured to coordinate storage of indicia of the user-specified presentation settings in the memory. Such configuration is useful, for example, to allow different users to share a customized viewing experience of the audio/video program.

The second operation illustrated in FIG. 2 is to coordinate playback of the audio/video program based on the user-specified presentation settings (block 202). In the illustrated embodiment, a presentation module (e.g., the presentation module 118) is configured to selectively apply the user-specified presentation settings to the various portions of the audio/video program. In some instances, the presentation module can apply the user-specified presentation settings substantially on-the-fly during the initial playback session. For example, in response to the user specifying an audio setting for a portion of the audio/video program, the presentation module can apply the audio setting to that portion of the audio/video program during the initial playback session. As another example, in response to the user specifying a display setting for a portion of the audio/video program, the presentation module can apply the display setting to that portion of the audio/video program during the initial playback session.

If the user does not specify a presentation setting for a particular portion of the audio/video program, the presentation module can apply a predetermined presentation setting to that portion of the audio/video program. This predetermined presentation setting can correspond to, for example, a default presentation setting. Alternatively, or in conjunction, the presentation module can apply a presentation setting that is specified for a preceding portion of the audio/video program. For example, in response to the user specifying an audio setting for a preceding portion of the audio/video program, the presentation module can apply the audio setting to the preceding portion of the audio/video program as well as to subsequent portions of the audio/video program until the user specifies a modification of the audio setting. It is also contemplated that the presentation module can apply a presentation setting that is determined based on presentation settings that are specified for a preceding portion of the audio/video program and a subsequent portion of the audio/video program. For example, the user can specify a presentation setting for a preceding portion of the audio/video program and a different presentation setting for a subsequent portion of the audio/video program, and the presentation module can apply an "intermediate" presentation setting to an intermediate portion of the audio/video program. This "intermediate" presentation setting can be interpolated based on a change function, which can be a linear change function or a non-linear change function. Such configuration is useful, for example, to allow a gradual transition from one presentation setting to another presentation setting. Thus, for example, such configuration can be used to provide a gradual transition from a letterbox format to a pan and scan format, or vice versa.

Advantageously, since indicia of the user-specified presentation settings are stored in the memory, the presentation module can also apply the user-specified presentation settings during a subsequent playback session. In particular, in connection with the subsequent playback session, the presentation module can retrieve the indicia of the user-specified presentation settings from the memory and selectively apply the user-specified presentation settings to the various portions of the audio/video program. Thus, the user is not required to re-specify the presentation settings during the subsequent playback session. However, if desired, the user can specify additional or different presentation settings during the subsequent playback session, and these presentation settings can be processed in a similar manner as discussed above.

As discussed previously, the preferences module can be configured to receive user-specified presentation settings from another user via the network, and the preferences module can be configured to coordinate storage of indicia of the user-specified presentation settings in the memory. In connection with a playback session, the presentation module can retrieve the indicia of the user-specified presentation settings from the memory and selectively apply the user-specified presentation settings to various portions of the audio/video program. Thus, the user is not required to re-specify the presentation settings to replicate a customized viewing experience created by another user.

It should be recognized that the specific embodiments of the invention discussed above are provided by way of example, and various other embodiments are encompassed by the invention. For example, referring to FIG. 9 and FIG. 10, various aspects of the processing operations for the target region 904 can be performed automatically. For example, once the user specifies the target region 904, scaling of the target region can be performed automatically to fill the screen 900. As another example, once the user specifies the target region 904, the target region 904 can be shifted automatically, such that the target region 904 can remain substantially centered with respect to the object 908. Such automatic shifting can be performed by tracking movement of the object 908 using motion vectors associated with the object 908. Additional discussion regarding tracking objects using motion vectors can be found in the co-pending and co-owned patent application entitled "System and Method for Using Motion Vectors for Object Tracking," U.S. patent application Ser. No. 10/465,361, filed on Jun. 19, 2003, the disclosure of which is incorporated herein by reference in its entirety.

An embodiment of the invention relates to a computer storage product with a computer-readable medium having computer instructions or code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as CD/DVDs, CD-ROMs, and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, machine code, such as produced by a compiler, and files containing higher-level code that are executed by a computer using an interpreter. For example, an embodiment of the invention may be implemented using Java, C++, or other object-oriented programming language and development tools. Additional examples of computer code include, but are not limited to, encrypted code and compressed code.

Another embodiment of the invention can be implemented using hardwired circuitry in place of, or in combination with, computer code. With reference to FIG. 1, various components of the system 100 can be implemented using computer code, hardwired circuitry, or a combination thereof. Thus, for example, the preferences module 116 and presentation module 118 can be implemented using hardwired circuitry, such as, for example, using ASICs or PLDs. Also, for certain applications, the set of playback devices 120 can be implemented within the computer 102 using computer code, hardwired circuitry, or a combination thereof. For example, the computer 102 can include a DVD decoder chip, or the CPU 106 or the GPU 110 can be configured to execute a computer program such as a soft DVD decoder.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

The invention claimed is:

1. An apparatus to process an audio/video program, comprising:
a processing unit; and
a memory connected to the processing unit and including
a preferences module configured to
coordinate specification, by a first user, of multiple, first presentation settings with respective ones of multiple, first portions of said audio/video program and with a first attribute of said first user, wherein said preferences module is configured to receive input by said first user at different times during an initial playback session of said audio/video program for said first user, and said preferences module is configured to synchronize said first presentation settings with respective ones of said first portions of said audio/video program according to said different times when said input by said first user is received during said initial playback session of said audio/video program for said first user, and
coordinate specification, by a second user, of multiple, second presentation settings with respective ones of multiple, second portions of said audio/video program and with a second attribute of said second user, wherein said preferences module is configured to receive input by said second user at different times during an initial playback session of said audio/video program for said second user, and said preferences module is configured to synchronize said second presentation settings with respective ones of said second portions of said audio/video program according to said different times when said input by said second user is received during said initial playback session of said audio/vide program for said second user; and
a presentation module coupled to said preferences module, said presentation module being configured to,
during a subsequent playback session of said audio/video program for said first user,
based on said first attribute of said first user, retrieve said first presentation settings for said first user, and
selectively apply said first presentation settings to respective ones of said first portions of said audio/video program, such that said first presentation settings remain synchronized with respective ones of said first portions of said audio/video program during said subsequent playback session for said first user, and
during a subsequent playback session of said audio/video program for said second user,
based on said second attribute of said second user, retrieve said second presentation settings for said second user, and
selectively apply said second presentation settings to respective ones of said second portions of said audio/video program, such that said second presentation settings remain synchronized with respective ones of said second portions of said audio/video program during said subsequent playback session for said second user.

2. The apparatus of claim 1, wherein said preferences module is configured to coordinate said specification of said first presentation settings with respective ones of said first portions of said audio/video program based on multiple, first time stamps associated with said first portions of said audio/video program, and said preferences module is configured to coordinate said specification of said second presentation settings with respective ones of said second portions of said audio/video program based on multiple, second time stamps associated with said second portions of said audio/video program.

3. The apparatus of claim 1, wherein at least one of said first presentation settings and said second presentation settings corresponds to one of an audio setting and a display setting.

4. The apparatus of claim 3, wherein said audio setting corresponds to one of an audio channel setting, an audio field setting, an audio format setting, a dynamic range setting, a language setting, a pitch setting, a playback speed setting, a tone setting, and a volume setting.

5. The apparatus of claim 3, wherein said display setting corresponds to one of a brightness setting, a black and white setting, a contrast setting, a color setting, a fast motion setting, a flicker setting, a gamma setting, a hue setting, a letterbox setting, a non-square zoom setting, a pan and scan setting, a pillar-box setting, a pixel blurring setting, a pixel sharpening setting, a red-eye setting, a slow motion setting, and a zoom setting.

6. The apparatus of claim 1, wherein said preferences module is configured to coordinate storage of said first presentation settings and said first attribute of said first user, and said preferences module is configured to coordinate storage of said second presentation settings and said second attribute of said second user.

7. The apparatus of claim 6,
wherein said memory is configured to store said first presentation settings and said first attribute of said first user and said second presentation settings and said second attribute of said second user.

8. The apparatus of claim 1, wherein said preferences module is configured to: (a) receive input, by said first user, of a first display setting while a first video frame of said audio/video program is displayed during said initial playback session of said audio/video program for said first user, (b) synchronize said first display setting with said first video frame, (c) receive input, by said first user, of a second display setting while a second video frame of said audio/video program is displayed during said initial playback session of said audio/video program for said first user, and (d) synchronize said second display setting with said second video frame, and said presentation module is configured to, during said subsequent playback session of said audio/video program for said first user, apply said first display setting and said second display setting to said first video frame and said second video frame, respectively.

9. The apparatus of claim 8, wherein said first display setting and said second display setting are associated with different scaling factors.

10. The apparatus of claim 8, wherein said first display setting and said second display setting are associated with different aspect ratios.

\* \* \* \* \*